Patented Aug. 22, 1944

2,356,154

UNITED STATES PATENT OFFICE 2,356,154

CYCLIC KETALS OF 3-KETO-17-OXY-CY-THRENES AND METHOD OF PREPARING 3-KETO-17-OXY-CYTHRENES

Erhard Fernholz, deceased, late of Princeton, N. J., by Mary Briganti Fernholz, administratrix, Princeton, N. J., assignor to E. R. Squibb & Sons, New York, N. Y., a corporation of New York No Drawing. Application August 19, 1941, Serial No. 407,497

4 Claims. (Cl. 260—239.5)

This invention relates to the production of derivatives of 3,17-diketocyclopentanoperhydrophenanthrenes, especially to the production of 3-keto-17-oxy compounds of the androstane series, such as testosterone.

For brevity and convenience, the term "cyclopentanoperhydrophenanthrene" is hereinafter replaced by the apt, telescopically-formed term cythrene.

The prior methods of preparing testosterone, for example, have been complicated and inefficient. Thus, its preparation from dehydroandrosterone involves the following steps: reduction, conversion to a di-ester, partial saponification, bromination, oxidation, debromination, and saponification.

It is the object of this invention to provide a simple and efficient method of preparing 3-keto-17-oxy-cythrenes, especially testosterone; and it is a further object of this invention to provide cyclic ketals of 3-keto-17-oxy-cythrenes and a method of preparing them.

The method of this invention essentially comprises reacting a 3,17-diketo-cythrene with an aliphatic polyhydric alcohol—preferably under conditions favoring the production of a mono-(cyclic ketal)—and reducing the thus-formed 3,17-diketo-cythrene-3-(cyclic ketal). The 3,17-diketo-cythrene-3-(cyclic ketal) and the reduced product, a 3-keto-17-hydroxy-cythrene-(cyclic ketal) are valuable intermediates for the production of various derivatives; thus, they may be converted into various derivatives involving the 17-keto or the 17-hydroxy group, or the 17-hydroxy compound may be hydrolyzed to yield the corresponding 3-keto-17-hydroxy-cythrene (which, in turn, may be converted into various derivatives involving the 17-hydroxy group).

The following examples are illustrative of the invention:

Example 1

(a) 1.0 g. 3,17-androstenedione ($\Delta^4$-androstenedione-3,17), 0.23 cc. ethylene glycol, and a crystal of p-toluenesulfonic acid are dissolved in 50 cc. benzene, and the mixture is slowly distilled for 4 hours. 10 cc. of 2% alcoholic KOH is then added, followed by water, and the reaction mixture is extracted with ether, which is removed from the extract; the residue dissolved in a small quantity of methanol; on standing for about 16 hours, there is obtained 0.5 g. of a crystalline product consisting of a mixture of mono- and di-(ethylene ketals) of 3,17-androstenedione.

The oily mother liquor from which the mixture of ketals crystallizes is reconverted into 3,17-androstenedione by refluxing for 1 hour in alcohol containing a few cc. of dilute hydrochloric acid, then adding water, extracting with ether, evaporating, and recrystallizing the residue. The unused 3,17-androstenedione is thus recovered almost quantitatively, and can be returned to the ketal-forming treatment.

(b) The mixture of ketals is dissolved in benzene, filtered through a 2 x 21 cm. column of alumina, and the column gradually washed through with benzene. The first 100 cc. of benzene contains 3,17-androstenedione-di-(ethylene ketal). The washing is then continued with benzene containing 10% alcohol, and on removal of the solvent from this wash, 0.3 g. of 3,17-androstenedione-3-(ethylene ketal) is obtained. It crystallizes from methanol in the form of thick prisms melting at 194° C.; this, however, is an unstable modification, which, on solidifying from the melted form, is transformed into the more stable modification melting at 202° C. The thus-obtained mono-(cyclic ketal) has the ketal group on $C_3$, as clearly indicated by the facts that it does not have the characteristic absorption spectrum of an $\alpha$-$\beta$-unsaturated ketone and that it is transformed into testosterone-(ethylene ketal) on hydrogenation.

(c) 3 g. 3,17-androstenedione-3-(ethylene ketal) is dissolved in 300 cc. of absolute alcohol, and 30 g. metallic sodium is added in small pieces to the boiling solution. After the sodium has dissolved, the solution is poured into 0.5 liter water, and the organic matter extracted with ether. On evaporation of the ether, a crystalline residue of the practically pure testosterone-(ethylene ketal) is obtained. On recrystallization from methanol, it is obtained as flat, brittle needles, which become opaque on drying, and melt at 183° C.

(d) The testosterone-(ethylene ketal) is hydrolyzed by refluxing it for 1 hour in alcohol containing a few cc. of dilute hydrochloric acid, adding water, extracting with ether, evaporating the ether, and recrystallizing the residue. Testosterone is thus obtained in quantitative yield.

Example 2

1.6 g. of a concentrate of 3,17-androstenedione obtained by oxidation of cholestenone (U. S. Patent 2,197,853) or cholesterol dibromide (Spielman and Meyer, J. A. C. S. 61, 893 (1939)) is dissolved in 50 cc. benzene; 0.25 cc. ethylene glycol and a crystal of p-toluenesulfonic acid are added; and the mixture is slowly distilled for 3½ hours.

Alcoholic KOH is then added, and the reaction product is taken up in ether and washed with water. The ether solution is dried and evaporated, and the oily residue dissolved in a small quantity of methanol; on standing, 0.38 g. of crystalline material settles out, which, when purified by adsorption on alumina as described in Example 1 (b), yields 0.3 g. of 3,17 androstenedione-3-(ethylene ketal). This ketal is then reduced as detailed in Example 1 (c); and the resulting testosterone-(ethylene ketal) may then be hydrolyzed to testosterone as detailed in Example 1 (d).

The invention is manifestly applicable to the production of 3-keto-17-oxy-cythrenes other than testosterone, as well as the production of cyclic ketals of 3-keto-17-oxy-cythrenes other than testosterone-(cyclic ketal), by substituting, for the 3,17-androstenedione in the foregoing examples, other 3,17-diketo-cythrenes, inter alia, 3,17-androstanedione, $\Delta^4$-androstenetrione-3,11,-17, $\Delta^{4,6}$-androstadiene-dione-3,17, $\Delta^1$-androstenedione-3,17, $\Delta^5$-androstenedione-3,17, $\Delta^4$-androstenetrione-3,6,17, and 5,6-oxo-androstanedione-3,17.

The ethylene glycol reactant employed in the foregoing example may be replaced by other aliphatic polyhydric alcohols, inter alia, 1,2-propylene glycol, glycerol, trimethylene glycol, and various carbohydrates. Among the conditions maximizing the production of the mono-(cyclic ketal), and minimizing the production of di-(cyclic ketal), is a greater ratio of 3,17-diketo-cythrene to aliphatic polyhydric alcohol (cf. the ratio in Example 2 as compared with that in Example 1). The reduction of the 3,17-diketo-cythrene-3-(cyclic ketal) may be effected by any other conventional reducing agents for reducing a 17-keto to 17-hydroxy group, inter alia, sodium in propyl alcohol, and hydrogenation in alcohol solution in the presence of nickel (or other metallic hydrogenation catalyst). The conversion of the 3-keto-17-hydroxy-cythrene-(cyclic ketal) into the corresponding 3-keto-17-hydroxy-cythrene may be effected by any conventional acid hydrolytic treatment.

When using 3,17-androstenedione and other $\Delta^4$-3,17-diketo-cythrenes, it is believed that there is a shift of the double bond to the 5-6 position on formation of the cyclic ketal, and that the bond shifts back to the 4-5 position on regeneration of the keto group; but it is not intended that the invention shall be limited by any theoretical explanations.

The invention may be variously otherwise embodied within the scope of the appended claims.

What is claimed is:

1. The method which comprises reacting a 3,17-diketo-cythrene with an aliphatic polyhydric alcohol, separating the mono- and di-(cyclic ketals) formed by adsorption and fractional elution, and reducing the thus-obtained 3,17-diketo-cythrene-3-(cyclic ketal).

2. The method which comprises reacting 3,17-androstenedione with an aliphatic polyhydric alcohol, separating the mono- and di-(cyclic ketals) formed by adsorption and fractional elution, and reducing the thus-obtained 3,17-androstenedione-3-(cyclic ketal).

3. The method which comprises reacting a 3,17-diketo-cythrene with ethylene glycol, separating the mono- and di-(ethylene ketals) formed by adsorption and fractional elution, and reducing the thus-obtained 3,17-diketo-cythrene-3-(ethylene ketal).

4. The method which comprises reacting 3,17-androstenedione with ethylene glycol; adsorbing the mixture of mono- and di-(ethylene ketals) formed on alumina, washing the alumina with benzene and then with benzene containing about 10% alcohol, recovering 3,17-androstenedione-3-(ethylene ketal) from the latter wash, and reducing the 3,17-androstenedione-3-(ethylene ketal).

MARY BRIGANTI FERNHOLZ,
*Administratrix of Estate of Erhard. Fernholz,
Deceased.*